United States Patent [19]
Corbett

[11] 3,793,189
[45] Feb. 19, 1974

[54] RECONSTITUTED ASPHALT PAVING COMPOSITIONS

[75] Inventor: Luke W. Corbett, Mountainside, N.J.

[73] Assignee: Esso Research and Engineering Company, Linden, N.J.

[22] Filed: Dec. 3, 1971

[21] Appl. No.: 204,738

[52] U.S. Cl.................................... 208/23, 208/22
[51] Int. Cl............................................... C10c 3/00
[58] Field of Search................................ 208/23, 22

[56] References Cited
UNITED STATES PATENTS
2,131,205  9/1938  Wells et al........................... 208/41
2,317,150  4/1943  Lovell et al.......................... 208/23
3,087,887  4/1963  Corbett et al....................... 208/23

Primary Examiner—Herbert Levine

[57] ABSTRACT

Asphaltic compositions suitable for use in paving formulations and having desirable viscosity, temperature susceptibility and ductility properties can be made by combining propane precipitated asphalt, asphaltenes and a liquid petroleum derivative such as a heavy distillate or residual oil. These compositions allow maximum utilization of low cost asphaltenes and produce compositions having improved viscosity and temperature susceptibility properties.

6 Claims, No Drawings

RECONSTITUTED ASPHALT PAVING COMPOSITIONS

BACKGROUND OF THE INVENTION

1. Field of the Invention

This invention relates to asphaltic compositions suitable for use in paving formulations. These compositions are produced by combining propane precipitated asphalt, asphaltenes and liquid petroleum derivatives such as heavy distillate fractions or residual oils. These asphaltic compositions exhibit desirable properties of viscosity, temperature susceptibility and ductility while, at the same time, they allow maximum utilization of low cost ingredients such as asphaltenes.

2. Description of the Prior Art

It is known that asphalt is composed of several fractions such as an oil-soluble fraction often termed the petrolene fraction and a solid, oil-insoluble fraction termed the asphaltene fraction. Processes are well-known for separating asphalts into such fractions. For example, in U.S. Pat. No. 3,087,887 a method of separating asphalt into these constituent fractions is disclosed.

It is also known that asphalts can be prepared by blending the constituents of an asphalt with other asphalt fractions so as to reconstitute the asphalt. The above noted U.S. patent, as well as U.S. Pat. No. 2,131,205 and British Patents 990,953 and 1,216,792, discloses such processes.

SUMMARY OF THE INVENTION

It has now been found that an asphaltic composition useful for formulating paving materials can be made by combining two distinct asphalt fractions with a liquid petroleum fraction. The asphalt fraction are an asphaltene fraction and a propane precipitated asphalt fraction. The liquid petroleum fraction is a distillate or residual oil having an initial boiling point above about 600°F. The liquid petroleum derivative can be combined with both these fractions directly or it can be first combined with one of the above fractions and then with the other.

The compositions produced by this novel and unobvious process exhibit viscosity, temperature susceptibility and ductility properties which are both desirable and unexpected. Furthermore, this inventive process allows maximum utilization of asphaltene fractions which would otherwise not be suitable for use in paving formulations.

DETAILED DESCRIPTION OF THE INVENTION

In accordance with the present invention, asphaltic compositions suitable for use in paving formulations are prepared by combining two separate types of asphaltic fractions with a liquid petroleum derivative.

Asphaltenes are known to the art as the highly aromatic, high molecular weight constituents contained in most crude petroleum residua and natural asphalts, particularly in those known as asphalt-bearing residua. Typical properties of these materials are also known to the art, e.g. U.S. Pat. No. 3,093,573.

The asphaltenes used in the present invention are generally isolated by contacting an asphalt-bearing residuum with a solvent-precipitant, normally a liquid paraffin having five to nine carbon atoms, in a ratio by volume of at least 4 parts of solvent-precipitant per part of residuum. The precipitant causes the asphaltene fraction to precipitate out as a solid material which can be subsequently removed by filtration, centrifugation, etc. A detailed description of one method of recovering asphaltenes is given in the above-mentioned U.S. Pat. No. 3,087,887. The asphaltenes of this invention are characterized by the substantial lack of any petrolene, e.g. aliphatic hydrocarbon soluble, component.

In a preferred embodiment of this invention, asphaltenes are obtained by contacting a residuum with at least 4 parts by volume of normal heptane and recovering the insoluble portion. The insoluble portion is termed heptane precipitated asphaltenes.

Asphaltenes suitable for use in this invention have softening points according to ASTM D–36–70 above about 350°F., preferably above about 450°F or capillary tube melting points above about 300°F, preferably above about 400°F.

Another component used in compositions of this invention is propane precipitated asphalt obtained by precipitation of the asphalt from a residuum with liquid propane, the volume of propane being at least two times that of the residuum. Propane precipitated asphalt is often obtained as a by-product of a propane deasphalting process. Such a process involves precipitation of asphalt from a residuum stock by treatment with propane under controlled conditions. Processes for obtaining propane precipitated asphalts suitable for use in this invention are well-known to the art. See, for example, the detailed description which appears in "Petroleum Refining With Chemicals", V. A. Kalichevsky and K. A. Kobe, Elsevier Publishing Co., New York, 1956, pgs. 382–396.

Propane precipitated asphalts suitable for use in this invention are characterized by having an ASTM D–5–65 penetration at 77°F of 0 to 50, preferably 0 to 25, most preferably 0 to 10 decimillimeters and a softening point of about 100 to 250, preferably about 150 to 225, most preferably about 160° to 220°F.

The feedstocks from which the above asphaltenes and propane precipitated asphalt fractions can be obtained include (but are not limited to) Lagunillas, Tia Juana, Boscan, Aramco, Talco, Kuwait, Oregon Basin, Lloydminister, Santa Maria, Kern River, Eucutta, Redwater, West Texas, Smackover crude oils and the like. The asphaltenes and the propane precipitated asphalt used in the process of this invention can be derived from the same or different feedstocks.

The third component used in the compositions of this invention is a liquid petroleum derivative having a pour point of about −10° to 130°F (ASTM D–97) and an atmospheric equivalent initial boiling point of about 600°F or higher (ASTM D–1160). Such fractions as gas oils, heavy distillates, process oils, lube oil extracts or deasphalted residual oils can be used. These can be derived by well-known techniques from the crude oils which are noted above as well as from other crudes which yield the fractions so identified.

Among the distillate oils that preferably can be used in the practice of this invention are vacuum gas oils boiling in the range of about 600° to 1,200°, preferably about 700° to 1,000°, most preferably about 800° to 900°F (atmospheric equivalent boiling ranges).

Among the residual oils that preferably can be used in this invention are those having initial boiling points above about 600°, preferably above about 700°, and most preferably above about 800°F (atmospheric equivalent boiling points). The residual oils used in the practice of this invention have heptane precipitatable asphaltene contents of at least 3 percent by weight as measured by Institute of Petroleum (Great Britain) Method IP 143/57.

Also among the liquid petroleum derivatives that can be used in the practice of this invention are crude oil residua which cannot be reduced by ordinary distillation techniques alone to asphalts satisfactory for use in paving compositions. Such crude residua include those derived from Pembina, Light Sour Blend and Light Arabian crudes.

Preferably, the liquid petroleum derivative of this invention is characterized by a high initial boiling point as noted above, a relatively high flash point (of 400°F or higher) and a viscosity suitable for blending, i.e. 30 to 4,000 SUS at 310°F, preferably 50 to 500 SUS at 210°F (ASTM D-455).

The compositions of this invention contain the following percentages of the above-described components (all percentages and parts in this application are by weight unless otherwise noted):

| Component | Broad, % | Preferred, % | Most Preferred, % |
|---|---|---|---|
| Asphaltenes | 5 to 40 | 10 to 40 | 10 to 25 |
| Propane Precipitated Asphalt | 10 to 50 | 10 to 30 | 15 to 30 |
| Petroleum Derivative | 10 to 75 | 20 to 55 | 25 to 45 |

Since the compositions of this invention are suitable for use in paving formulations, these compositions are also homogeneous as determined by the Oliensis spot test (AASHO Designation Test T-102-57). This test is well-known to the art and has been set as a specification for paving asphalts by many road building organizations (see, e.g. U.S. Pat. No. 3,540,906, column 1, lines 38-42).

The above-described components are physically mixed or combined using techniques and equipment, such as pump circulating systems, tank stirrers, in-line mixers, etc., well-known to those with skill in the art.

It is also possible to prepare the compositions of this invention by adding propane precipitated asphalt and asphaltenes to the normal residuum from distillation of a crude and then redistilling the crude residua blend to form an asphalt useful for paving applications. It is particularly desirable to do this when the crude is one which does not give an asphalt satisfactory for paving use upon straight distillation.

It is still further possible to blend the propane precipitated asphalt and/or asphaltenes with a petroleum distillate commonly present as refinery processing stream, e.g. kerosene, for ease in handling and then combine these blends with the other components. The combination can then be distilled to allow recovery of the petroleum distillate and produce as a residue the asphaltic composition of this invention.

The properties which make an asphaltic composition suitable for use in paving formulations are well-known to those of ordinary skill in the art. Several such properties and the measurements which characterize a paving grade asphalt are summarized in Table I.

TABLE I

PROPERTIES OF ASPHALTIC COMPOSITIONS SUITABLE FOR USE IN PAVING FORMULATIONS

| Property | Analytical Method | Measurement Range |
|---|---|---|
| Penetration at 77°F, dmm. | ASTM D-5-65 | 30-300 |
| Penetration Ratio [39.2/77°F]×100 | — | 20-60 |
| Softening Point, °F | ASTM D-36-70 | 95-135 |
| Absolute Viscosity at 140°F, p | ASTM D-2171 | 350-9000 |
| Ductility at 77°F, cms. | ASTM D-113 | 10-100+ |
| Ductility at 39.2, cms. | ASTM D-113 | 0-100 |
| Oliensis Spot Test | AASHO T-102-57 | Negative |

As can be seen from the properties described herein, the compositions of this invention exhibit properties falling within these ranges.

The asphaltic compositions of this invention are especially advantageous in that they contain higher amounts of heptane precipitatable asphaltenes than are generally present in asphalts made by the ordinary processes of distillation and/or propane precipitation. Such high heptane precipitatable asphaltene contents are desirable because they enhance viscosity and temperature susceptibility properties of the asphaltic composition.

At the same time this feature of the invention confers economic advantages since heptane precipitated asphaltenes normally are incorporated in fuel products and thus are valued at only about 0.5 cents per pound. By incorporating them into asphaltic compositions suitable for paving formulations, their value is increased to 1.0 cents per pound and higher.

The heptane precipitatable asphaltene content of the asphaltic compositions of this invention range from about 15 to 55, perferably about 15 to 40% of the composition. This content can be measured by Institute of Petroleum (Great Britain) Method IP 143/57.

The invention will be more fully demonstrated by reference to the following examples.

EXAMPLES

PROCEDURE FOR PREPARING HEPTANE PRECIPITATED ASPHALTENES

Heptane precipitated asphaltenes used in the following examples were obtained by the following general procedure:

a. a residuum was heated with stirring at a temperature of about 200°F with 5 ml of n-heptane per gm of residuum for at least 15 minutes;

b. the mixture was stored for 16 hours at about 70°F and then filtered through Whatman No. 1 filter paper;

c. the residue of asphaltenes on the paper was washed with heptane at about 100° to 120°F until the filtrate was colorless;

d. the asphaltenes were then mixed with a second portion of n-heptane (approximately 5 ml per gram), warmed to about 200°F while being stirred, filtered and washed as in steps (b) and (c); and e. the asphaltenes were dried under a nitrogen atmosphere.

The propane precipitated asphalts used in the following examples were obtained by procedures well-known to the art and characterized as noted below.

EXAMPLE 1

Propane precipitated asphalt (having a softening point of 212 of and a penetration of 0 at 77°F), 36%, and heptane precipitated asphaltenes, 20%, both derived from a Lagunillas crude, were blended with 44% of vacuum gas oil having an atmospheric equivalent boiling range of 800° to 900°F.

EXAMPLE 2

Propane precipitated asphalt, 23%, and heptane precipitated asphaltenes, 29% both of Example 1, were blended with 48% of the vacuum oil used in Example 1.

EXAMPLE 3

Propane precipitated asphalt, 24% and heptane precipitated asphaltenes, 32%, both of Example 1 were blended with 44% of the vacuum gas oil used in Example 1.

The properties of the compositions resulting from Examples 1–3 are compared in Table II with a typical asphalt (Control A) made by straight distillation and propane deasphalting of Lagunillas crude. The properties of this asphalt make it suitable for use in paving formulations.

tenes (also derived from West Texas crudes) in kerosene and heating to 300° to 400°F. Solution II contained 34% asphaltenes. Then 19.5 parts of Solution I and 24.0 parts of Solution II were mixed with 57.5 parts of straight run Lagunillas residuum having a cut point of 700°F (atmospheric equivalent vapor temperature and a heptane precipitatable asphaltene content of 11.5%). This mixture was then distilled to a 750°F cut point (atmospheric equivalent vapor temperature) to remove volatiles and produce an asphaltic composition whose properties are summarized below in Table III.

EXAMPLE 5

The components described in Example 4 were mixed in the following proportions: Solution I, 15.2%; Solution II, 40.3%; Lagunillas residuum, 44.5%. The mixture was then distilled to a cut point of 745°F (atmospheric equivalent vapor temperature) to remove volatiles and produce an asphaltic composition whose properties are described below.

EXAMPLE 6

Solution II of Example 4 was combined with propane precipitated asphalt (having a penetration of 18 dmm. at 77°F) derived from a Redwater, Alberta, crude and vacuum gas oil having an atmospheric equivalent boiling range of 750° to 960°F in the following proportions: Solution II, 20.8%; propane precipitated asphalt, 41.7%; vacuum gas oil, 37.5%. This mixture was then vacuum distilled to a cut point of 762°F (atmospheric equivalent of vapor temperature) to produce an asphal-

TABLE II

|  | Example 1 | Example 2 | Example 3 | Control A (Lagunillas Asphalt) | Analytical Method |
|---|---|---|---|---|---|
| Penetration at 77°F, dmm. | 82 | 121 | 63 | 90 | ASTM D-5-65 |
| Penetration Ratio [39.2/77°F] × 100 | 56 | 46 | 56 | 35 |  |
| Softening Point °F | 120 | 113 | 126 | 115 | ASTM D-36-70 |
| Viscosity at 140°F, p. | 3295 | 2645 | 7170 | 1850 | ASTM D-2171 |
| Ductility at 77°F, cms. | 100+ | 100+ | 100+ | 100+ | ASTM D-113 |
| Ductility at 39.2°F, cms. | 5 | 6 | 1 | 5 | ASTM D-113 |
| Heptane Precipitatable Asphaltenes, % | 28 | 34 | 37 | 13 | IP 143/57 |

As can be seen from Table II, compositions of this invention (Examples 1 to 3) have significantly higher heptane precipitatable asphaltene contents and significantly higher absolute viscosities at 140°F than the asphalt made by conventional techniques (Control A). As noted above, it is desirable to maximize the asphaltene content of an asphaltic composition since asphaltenes are generally in excessive supply and have to be disposed of as low cost fuels. Furthermore, the increased heptane precipitatable content of an asphaltic composition leads to both improved, i.e. high viscosities at 140°F, and improved temperature susceptibility properties as reflected by the higher penetration ratios.

EXAMPLE 4

Propane precipitated asphalt (having a softening point of 165°F and a penetration at 77°F of 3 dmm.) derived from West Texas crudes was blended with kerosene to facilitate transport. This Solution (I) contained 70% propane precipitated asphalt. Solution II was prepared by mixing heptane precipitated asphaltic composition whose properties are described below.

Control B was made by blending 71.3% of the residuum of Example 4 with 28.8% of the propane precipitated asphalt of Example 4.

Control C was made by blending 78% of the Redwater propane precipitated asphalt of Example 6 with 22% of the vacuum gas oil of Example 6. Controls B and C each lack an essential step of the process of the invention, that is blending a heptane precipitated asphaltene fraction with the other two components.

TABLE III

|  | Examples | | | Controls | |
|---|---|---|---|---|---|
|  | 4 | 5 | 6 | B | C |
| Asphaltic Product Composition (%) | | | | | |
| Lagunillas residuum | 73.5 | 66.6 |  | 71.2 |  |
| PPA asphalt | 16.5 | 14.1 |  | 28.8 |  |
| Asphaltenes | 10.0 | 19.3 | 20.8 |  |  |
| Redwater PPA |  |  | 41.7 |  | 78 |
| Vacuum Gas Oil |  |  | 37.5 |  | 22 |

Properties of Asphalt Product[1]

TABLE III-Continued

|  | Examples | | | Controls | |
| --- | --- | --- | --- | --- | --- |
|  | 4 | 5 | 6 | B | C |
| Asphaltic Product Composition (%) | | | | | |
| Penetration at 77°F, dmm. | 90 | 90 | 90 | 90 | 90 |
| Pen ratio (39.2/77°)×100 | 43 | 48 | 47 | 32 | 22 |
| Ductility at 77°F, cms., | 100+ | 100+ | 100+ | 100+ | 100+ |
| Absolute Vis at 140°F, p | 2280 | 3050 | 1940 | 1500 | 725 |

¹Interpolated to 90 penetration

It can be seen from a comparison of the absolute viscosities at 140°F of Examples 4, 5 and 6 with those of Controls B and C that the compositions of each of the examples have much higher, that is, more desirable viscosities.

The penetration ratios of Examples 4, 5 and 6 are also desirably higher than those of Controls B and C, again reflecting improved temperature susceptibilities. This means that the asphalt compositions become less fluid at higher temperatures and less brittle at low temperatures, distinct advantages in field use.

It is not intended that the scope of this invention be limited to the specific examples presented above which are only by way of illustration. The scope of the invention is limited only by the appended claims.

What is claimed is:

1. An asphaltic composition suitable for use in a paving formulation, said composition being prepared by combining, in weight percent based on the total composition:
   a. about 5 to 40 weight percent of asphaltenes having a softening point greater than about 350°F. and characterized by the substantial lack of petrolenes;
   b. about 10 to 50 weight percent of propane precipitated asphalt from which no asphaltenes have been removed having an ASTM D-5-65 penetration at 77°F. of from zero to 50 decimillimeters; and
   c. about 10 to 75 weight percent of a liquid residual petroleum fraction having an atmospheric equivalent initial boiling point of at least 600°F. and having a heptane precipitatable asphaltene content of at least 3 percent by weight.

2. A composition according to claim 1 which is made by the process of:
   a. blending said propane precipitated asphalt with a petroleum distillate to form a first liquid blend;
   b. blending said asphaltenes with a petroleum distillate to form a second liquid blend;
   c. blending said first and second blends with a residual petroleum oil to form a mixture; and
   d. distilling said mixture so as to substantially recover said petroleum distillate and so as to leave said asphaltic composition as a residue.

3. The composition of claim 1 wherein said liquid petroleum fraction constitutes about 20 to 55 weight percent of said composition.

4. The composition of claim 1 wherein said asphaltenes of component (a) constitute about 10 to 25 percent of said composition.

5. The composition of claim 1 wherein said propane precipitated asphalt constitutes about 10 to 30 weight percent of said composition.

6. The composition of claim 1 wherein said asphaltenes have been obtained from a residuum by normal haptane precipitation.

* * * * *